United States Patent [19]
Elander et al.

[11] Patent Number: 5,323,464
[45] Date of Patent: Jun. 21, 1994

[54] COMMERCIAL DATA MASKING

[75] Inventors: Robert C. Elander, Saugerties, N.Y.; Christopher J. Holloway, Woking, United Kingdom; Donald B. Johnson, Manassas, Va.; Michael J. Kelly, Poughkeepsie, N.Y.; An V. Le, Manassas, Va.; Paul G. Lubold, Kingston, N.Y.; Stephen M. Matyas, Manassas; James D. Randall, Herndon, both of Va.

[73] Assignee: International Business Machines Corporation, Armonk, N.Y.

[21] Appl. No.: 962,951

[22] Filed: Oct. 16, 1992

[51] Int. Cl.$^5$ .................. H04L 9/02; H04L 9/00; H04K 1/00
[52] U.S. Cl. ...................... 380/24; 380/29; 380/44
[58] Field of Search .............. 380/21, 28, 29, 30, 380/6, 44

[56] References Cited

U.S. PATENT DOCUMENTS 3,958,081  5/1976  Ehrsam et al. .
3,962,539  6/1976  Ehrsam et al. .
4,405,829  9/1983  Rivest et al. .
4,941,176  7/1990  Matyas et al. ............ 380/21
5,142,578  8/1992  Matyas et al. ............ 380/21

OTHER PUBLICATIONS

ANSI X 3.92, 1981, "Data Encryption Algorithm".

Primary Examiner—Stephen C. Buczinski
Attorney, Agent, or Firm—John E. Hoel

[57] ABSTRACT

A method and system are disclosed for the implementation of a weakened privacy channel. This is achieved through use of a weakened symmetric cryptographic algorithm called commercial data masking. The masked text is created from clear text at one system and may to transported electronically to another system where the masked text may be unmasked to produce the clear text. The reason to use the commercial data masking algorithm for data privacy is that it is exportable to organizations to which products which contain the Data Encryption Algorithm when used for data privacy are not exportable. In addition, a method and system is disclosed by which the key when used for commercial data masking may be transformed into a key that may be used with the Data Encryption Algorithm.

20 Claims, 7 Drawing Sheets

FIG. 1

RED CRYPTOGRAPHIC SYSTEM

```
CRYPTOGRAPHIC SERVICES
  - DEA-BASED KEY MANAGEMENT SERVICES
  - DEA-BASED PERSONAL IDENTIFICATION
        NUMBER PROCESSING SERVICES
  - DEA-BASED DATA INTEGRITY SERVICES
  - DEA-BASED DATA PRIVACY SERVICES      1
```

GREEN CRYPTOGRAPHIC SYSTEM

```
CRYPTOGRAPHIC SERVICES
  - DEA-BASED KEY MANAGEMENT SERVICES
  - DEA-BASED PERSONAL IDENTIFICATION
        NUMBER PROCESSING SERVICES
  - DEA-BASED DATA INTEGRITY SERVICES
  - CDM-BASED DATA PRIVACY SERVICES      2
```

YELLOW CRYPTOGRAPHIC SYSTEM

```
CRYPTOGRAPHIC SERVICES
  - DEA-BASED KEY MANAGEMENT SERVICES
  - DEA-BASED PERSONAL IDENTIFICATION
        NUMBER PROCESSING SERVICES
  - DEA-BASED DATA INTEGRITY SERVICES
  - DEA-BASED DATA PRIVACY SERVICES      1
  - CDM-BASED DATA PRIVACY SERVICES      2
```

FIG. 2

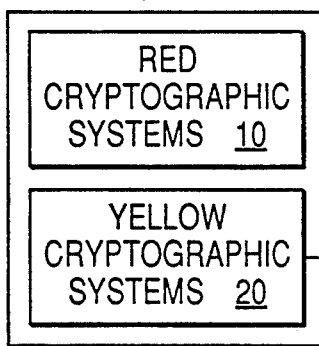
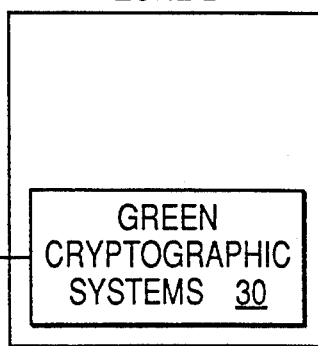

ZONE : A   USA, CANADA AND SOME FOREIGN LOCATIONS.
ZONE : B   OTHER FOREIGN LOCATIONS NOT IN ZONE A.

FIG. 11

EXAMPLE OF ONE-WAY FUNCTION 640

635 I_ZERO KEY

PREDETERMINED CONSTANT X'0123456789ABCDEF' → DEA ENCRYPT

↓ C

XOR

645 I_PROTECT KEY

FIG. 12

EXAMPLE OF KEY-BIT SELECT FUNCTION 650

645 I_PROTECT KEY

PREDETERMINED CONSTANT X'FEFEFEFEFEFEF80001' → AND

655 I_WEAK KEY

FIG. 13

EXAMPLE OF RANDOMIZED KEY-SELECT FUNCTION 660

655 I_WEAK KEY

PREDETERMINED CONSTANT X'FEDCBA9876543210' → DEA ENCRYPT

505 KWEAK KEY

COMMERCIAL DATA MASKING

BACKGROUND OF THE INVENTION

1. Technical Field

The invention disclosed broadly relates to data processing systems and methods and more particularly relates to cryptographic systems and methods for use in data processing systems to enhance security.

2. Background Art

The following patents and patent applications are related to this invention and are incorporated herein by reference:

W. F. Ehrsam, et al., "Block Cipher System for Data Security," U.S. Pat. No. 3,958,081, issued May 18, 1976, assigned to IBM Corporation and incorporated herein by reference.

W. F. Ehrsam, et al., "Product Block Cipher System," U.S. Pat. No. 3,962,539, issued Jun. 8, 1976, assigned to IBM Corporation and incorporated herein by reference.

S. M. Matyas, et al., "Secure Management of Keys Using Control Vectors," U.S. Pat. No. 4,941,176, issued Jul. 10, 1990, assigned to IBM Corporation and incorporated herein by reference.

S. M. Matyas, et al., "Data Cryptography Operations Using Control Vectors," U.S. Pat. No. 4,918,728, issued Apr. 17, 1990, assigned to IBM Corporation and incorporated herein by reference.

S. M. Matyas, et al., "Personal Identification Number Processing Using Control Vectors," U.S. Pat. No. 4,924,514, issued May 8, 1990, assigned to IBM Corporation and incorporated herein by reference.

S. M. Matyas, et al., "Secure Management of Keys Using Extended Control Vectors," U.S. Pat. No. 4,924,515, issued May 8, 1990, assigned to IBM Corporation and incorporated herein by reference.

S. M. Matyas, et al., "Secure Management of Keys Using Control Vectors with Multi-Path Checking," Ser. No. 07/596,637, filed Oct. 12, 1990, assigned to IBM Corporation and incorporated here by reference.

S. M. Matyas, et al., "Secure Cryptographic Operations Using Alternate Modes of Control Vector Enforcement," Ser. No. 07/574,012, filed Aug. 22, 1990, assigned to IBM Corporation and incorporated here by reference.

S. M. Matyas, et al., "Secure Key Management Using Programmable Control Control Vector Checking," U.S. Pat. No. 5,007,089, issued Apr. 9, 1991, assigned to IBM Corporation and incorporated herein by reference.

S. M. Matyas, et al., "Secure Key Management Using Control Vector Translation," U.S. Pat. No. 54,993,069 issued Feb. 12, 1991, assigned to IBM Corporation and incorporated herein by reference.

B. Brachtl, et al., "Data Authentication Using Modification Detection Codes Based on a Public One Way Encryption Function," U.S. Pat. No. 4,908,861, issued Mar. 13, 1990, assigned to IBM Corporation and incorporated herein by reference.

D. Abraham, et al., "DEA-Based Pseudorandom Number Generator," IBM Technical Disclosure Bulletin, Vol. 35, No. 1B, pp. 431–434 (June 1992).

With the advent of electronic data processing, vast amounts of digital data are stored in large computer data bases and transmitted between computers and workstations linked together in complex communications networks. Cryptographic algorithms have been developed and implemented in products to encrypt and protect stored and transmitted data.

U.S. Pat. Nos. 3,958,081 and 3,962,539 describe an IBM-invented cryptographic algorithm that was adopted as a federal Data Encryption Standard (DES) on Jul. 15, 1977, and described in Federal Information Processing Standard FIPS 46-1. The DES algorithm was also adopted by the American National Standards Institute (ANSI) as the standard industry algorithm ("Data Encryption Algorithm (DEA)" X3.92), see ANSI X3.92-1981. The DEA is a symmetric (secret key) block cipher that encrypts a 64-bit input plaintext to produce a 64-bit output ciphertext using a secret 64-bit key. The 64-bit key consists of 56 independent key bits and 8 non-key bits that may be used for parity checking. The DEA is the most widely used commercial encryption algorithm. It has become a de facto international standard. The DEA is particularly suited for bulk data encryption. Hardware implementations of the DEA are able to encrypt several hundred megabits of data per second.

Other cryptographic algorithms have also been developed for commercial use, particularly public key algorithms. Public key encryption algorithms are described in a paper by W. Diffie and M. E. Hellman entitled "Privacy and Authentication: An Introduction to Cryptography," *Proceedings of the IEEE*, Vol. 67, No. 3, March 1979, pp. 397–427. In a public key cryptographic system, two keys are used, one for enciphering and one for deciphering. Public key algorithm systems are designed so that (1) it is easy to generate a random pair of inverse keys PU (for enciphering) and PR (for deciphering) and (2) it is easy to operate with PU and PR, but (3) it is computationally infeasible to compute PR from PU. Each user generates a pair of inverse transforms, PU and PR. He keeps the deciphering transformation PR secret, and makes the enciphering transformation PU public by placing it in a public directory. Anyone can now encrypt messages and send them to the user, but no one else can decipher messages intended for him. It is possible, and often desirable, to encipher with PU and decipher with PR. For this reason, PU is usually referred to as a public key and PR is usually referred to as a private key. A corollary feature of public key cryptographic systems is the provision of a digital signature which uniquely identifies the sender of a message. If user A wishes to send a signed message M to user B, he operates on it with his private key PR to produce the signed message S. PR was used as A's deciphering key when privacy was desired, but it is now used as his "enciphering" key. When user B receives the message S, he can recover the message M by operating on the ciphertext S with A's public PU. By successfully decrypting A's message, the receiver B has conclusive proof it came from the sender A. Examples of public key cryptography are provided in the following U.S. Pat. No. 4,218,582 to Hellman, et al., "Public Key Cryptographic Apparatus and Method;" U.S. Pat. No. 4,200,770 to Hellman, et al., "Cryptographic Apparatus and Method;" and U.S. Pat. No. 4,405,829 to Rivest, et al., "Cryptographic Communications System and Method."

The Data Encryption Algorithm (DEA), when used for data confidentiality purposes, is not able to be exported from the USA because of export regulations on cryptography. It cannot be freely imported in some other countries. Export regulation relief is generally given for electronic data processing applications involving data integrity, identification and authentication, one-way encryption of passwords, key management, and key distribution.

To overcome the restrictions imposed on cryptographic applications by U.S. government export regulations, the U.S. government has permitted the RSA algorithm to be exported and used for applications involving data integrity and key distribution provided that the length of the keys is restricted or limited to an agreed upon value. For example, where the RSA algorithm is used in a hybrid key distribution scheme to encrypt DEA keys for distribution from a sending device to a receiving device, the RSA keys are limited to 512 bits. Market demands continue to be received for a suitable, fast encryption algorithm for data confidentiality purposes, which can be freely exported from the United States. A small number of proprietary algorithms have been developed to satisfy this market demand, but the algorithm details (of course) have not been published.

A general problem with proprietary algorithms is that, by not disclosing the details of an algorithm, cryptographers, cryptanalysts, mathematicians, and the like cannot study the algorithm and validate its strength. Hence, users cannot be certain of the degree of protection afforded by such a cryptographic algorithm. The process of developing and validating a cryptographic algorithm, if properly done, is a lengthy and costly process. For example, it took IBM 17 man-years to develop and validate the DEA. Instead of developing a new cryptographic algorithm of suitable weakened strength, it would be particularly advantageous to produce a weakened version of the DEA—i.e., a DEA junior—by weakening only the key or restricting the key space to a smaller number of allowed key combinations and by not changing or altering the DEA algorithm itself (s-box functions, permutation, key schedule). In this way, the basic underlying strength of DEA is preserved, and therefore no inadvertent shortcut attack is introduced into DEA junior. But by weakening the key, DEA junior can be given a predictable cryptographic strength, or work factor, based on recovering an unknown key using a method of direct search or key exhaustion (i.e., trying one key after another). In this case, validating the key-weakening process is a relatively simple process compared to validating a new algorithm, with an apparent savings in cost and time to the developer. The strength of such a DEA-junior algorithm can be easily demonstrated to users. The ability for users and implementers to easily assess the security provided by such an algorithm is deemed essential for its acceptance. Thus, when data is encrypted with DEA-junior, users receive and are assured of a known, predictable level of cryptographic protection. In this case, relief from U.S. government export regulations is achieved by weakening the key, or by adjusting the number of allowable key combinations, to a level prescribed by the U.S. government. The prior art does not teach how keys belonging to a strong block cipher algorithm, such as the DEA, can be weakened for the purpose of constructing a weakened block cipher algorithm of known, predictable strength.

One possibility for weakening a DEA key is to fix certain key bits so there are fewer independent key bits within the key. U.S. Pat. No. 4,908,861 to Brachtl et al. discloses a method of fixing bits in a cryptographic key for the purpose of ensuring that two keys used by the one-way algorithm are different. The bits in a first key are set to B'10' and the bits in a second key are set to B'01'. By ensuring that the first and seconds keys are different, the algorithm construction prevents a rare, but possible case from occurring which would weaken the one-way algorithm. In this regard, Brachtl et al. teach how bit fixing can be used beneficially to improve cryptographic strength. Brachtl et al. do not teach how bit fixing can be used for the purpose of weakening cryptographic strength. The prior art does not teach how to beneficially weaken a key by fixing key bits.

For purposes of discussion, a weakened Data Encryption Algorithm (referred to above as DEA junior) shall be referred to hereafter as Commercial Data Masking (CDM).

U.S. Pat. Nos. 4,941,176, 4,918,728, 4,924,514, 4,924,515, 4,993,069, 5,007,089, and patent application Ser. Nos. 07/596,637, and 07/574,012, cited above, describe a cryptographic architecture incorporated a set of hardware-level cryptographic instructions for processing data, Personal Identification Numbers (PINs), and keys. A corresponding set of cryptographic services accessible at a cryptographic Application Programming Interface (API), and which can itself be implemented using the aforesaid hardware-level cryptographic instructions, is called The IBM Common Cryptographic Architecture, see *Common Cryptographic Architecture Cryptographic Application Programming Interface*, SC40-1675, IBM Corporation (1990).

The Common Cryptographic Architecture (CCA) is based on the Data Encryption Algorithm (DEA). The Cryptographic API describes a set of cryptographic services that provide data privacy, data integrity, cryptographic key installation and generation, electronic cryptographic key distribution, and Personal Identification Number (PIN) processing. The data privacy cryptographic services include Encipher and Decipher services for enciphering and deciphering data using the DEA. In situations where a CCA-compliant cryptographic device is exported from the United States to a destination that cannot receive the DEA-based Encipher and Decipher services, it would be desirable for the DEA-based Encipher and Decipher services to be replaced within the cryptographic device with CDM-based Encipher and Decipher services, i.e., data enciphering and deciphering services based on a Commercial Data Masking algorithm. Likewise, it would be advantageous for the keys used by the CDM-based Encipher and Decipher services to be of the same form and length as the keys used by the DEA-based Encipher and Decipher services, so that the keys used by both DEA-based and CDM-based services can be generated and distributed using the key management and key distribution services of CCA (i.e., without modification). In this way, two communicating devices may use the commercial data masking algorithm to mask data transmitted between them. That is, data is masked at a sending device by invoking a CDM Encipher service and masked data is unmasked at a receiving device by invoking a CDM Decipher service. But a potential problem arises when the keys for the DEA-based Encipher and Decipher services and the keys for the CDM-based Encipher and Decipher services are of the same form and length, and are generated and distributed using the same set of CCA key management and key distribution services. Unless the keys are tagged so that the keys for the DEA-based services cannot be mixed and used with the CDM-based services, it may be possible for an insider adversary to attack a DEA key using the following method: (a) feed a strong DEA key to a CDM-based Encipher service to encrypt a known plaintext, (b) use the known plaintext and produced ciphertext to recover the weakened CDM key via a key exhaustion attack. The recovered CDM key may reveal some of the key bits in the original DEA key, which would weaken the DEA key and reduce the work necessary to recover the remaining unknown key bits. The prior art does not teach how two different algorithms of different strengths such as the DEA and CDM can be implemented safely in the same cryptographic system. That is, the prior art does not teach how the keys of both algorithms, which are of the same form and length and which use the same key generation and key distribution services, can co-exist such that the keys used with the stronger algorithm (i.e., DEA) cannot be attacked or weakened by treating them as keys belonging to the weaker algorithm (i.e., CMD) and using the provided CDM-based cryptographic services as an effective means to attack the stronger (DEA-based) keys.

One method for allowing DEA and CDM keys of the same form and length to co-exist within the same cryptographic system is to define separate key types and control vectors, i.e., to cryptographically "tag" each different type of key, and to use a means of control vector encryption to couple the control vector to the key.

U.S. Pat. Nos. 4,941,176, 4,918,728, 4,924,514, 4,924,515, 4,993,069, 5,007,089, and patent application Ser. Nos. 07/596,637, and 07/574,012, cited above, describe cryptographic instructions and key management capabilities based on control vectors. These concepts could be extended to include a new data key type called "CDM data key", which would operate with a new set of CDM-based Encipher and Decipher services. While this is a possible solution, it introduces an added level of complexity into the key management architecture. An alternative method is to make the key weakening process an irreversible process bound together with the CDM algorithm itself, such that knowledge of a weakened key, if revealed, would not reveal information about the strong key from which it was derived.

Cryptographic one-way functions are described in the prior art, but do not teach how such a one-way function can be used beneficially in a key-weakening process. For example, U.S. Pat. No. 4,908,861 to Brachtl discloses a method for calculating a one-way function of an input. The method makes use of a simple kernel function wherein an input is encrypted with a DEA key and then followed by Exclusive-OR operation involving the input and the output ciphertext. The kernel function provides a very simple one-way function that can be used as a building block to provide a much stronger one-way function. Brachtl et al. does not teach protecting an input key used within a key-weakening process.

OBJECTS OF THE INVENTION

It is therefore an object of the invention to provide a method for producing a commercial data masking algorithm (CDM) which is weaker than DEA.

It is another object of the invention to provide data privacy protection based on a CDM algorithm which is produced from the Data Encryption Algorithm (DEA) by using a key weakening process.

It is another object of the invention to provide a CDM algorithm of known strength.

It is another object of the invention to provide a CDM algorithm that can be generally exported from the United States of America and used for data privacy.

It is another object of the invention to provide a CDM algorithm such that the input keys to the CDM algorithm and to the DEA are of the same form and length.

It is another object of the invention to provide a CDM algorithm such that the input keys to the CDM algorithm and to the DEA are of the same form and length so that the keys used by CDM-based cryptographic services and keys used by DEA-based cryptographic services can be generated and distributed using a common set of key management and key distribution services.

It is another object of the invention to provide a CDM algorithm such that it is computationally infeasible to recover the input key to the CDM algorithm even if the internal key used to mask the data is recoverable.

SUMMARY OF THE INVENTION

These and other objects, features, and advantages are accomplished by the invention disclosed herein.

A commercial data masking algorithm is a special algorithm used for data privacy. In situations where DEA-based Encipher and Decipher services cannot be exported from the United States of America to a foreign destination, these DEA-based Encipher and Decipher services can be replaced by corresponding CDM-based Encipher and Decipher services and exported from the United States of America to the foreign destination. In this case, data communications to and from the foreign destination are protected using the CDM-based Encipher and Decipher services instead of DEA-based Encipher and Decipher services.

In situations where DEA-based Encipher and Decipher services can be provided, either inside or outside the United States of America, CDM-based Encipher and Decipher services can also be provided so that these devices can inter-operate with devices containing only CDM-based Encipher and Decipher services. In such cases, the owners of the cryptographic systems must decide how, when, and under what conditions data communications shall be routed from a DEA-based device to a CDM-based device, and vice versa.

The CDM algorithm has the following attributes:
1. A CDM key, like a DEA key, has 64 bits, 56 bits that determine the specific scrambling algorithm, and 8 bits which may be used for parity. This allows a CDM key to be distributed using DEA key distribution mechanisms.
2. A CDM key has an effective strength of 40 bits. This is achieved by a combination of bit fixing and encryption to effectively select a random set of $2^{40}$ keys from the space of $2^{56}$ keys.
3. Prior to fixing bits in a CDM key, the key is passed through a cryptographic one way function. This ensures that it is computationally infeasible to recover the input CDM key even if the internal key used to mask the data is recoverable.

BRIEF DESCRIPTION OF THE DRAWINGS

These and other objects, features, and advantages of the invention will be more fully appreciated with reference to the accompanying figures.

FIG. 1 is a block diagram illustration of the three types of cryptographic systems, red, green, and yellow, which may exist within a single cryptographic network.

FIG. 2 is a block diagram that depicts the world divided into two geographical zones, Zone A and Zone B.

FIG. 11 is a block diagram illustration of an example one-way function that maps a 64-bit input key, I_zero, to a 64-bit output key, I_protect.

FIG. 12 is a block diagram illustration of an example key-bit select function 650 that produces a 64-bit intermediate weakened key, I_weak, from a 64-bit intermediate protected key, I_protect.

FIG. 13 is a block diagram illustration of an example randomized key-select function 660 that produces a 64-bit weakened key, K weak, from a 64-bit intermediate weakened key, I_weak.

DESCRIPTION OF THE BEST MODE FOR CARRYING OUT THE INVENTION

Figure 3:
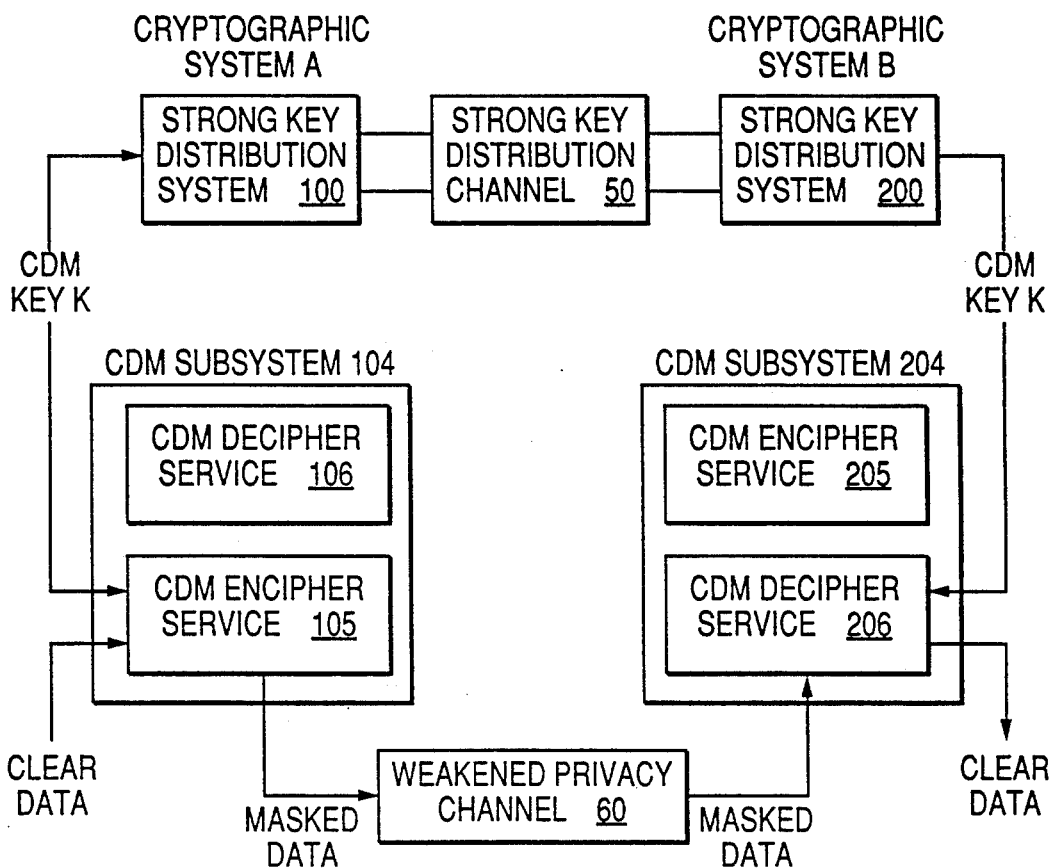
FIG. 3 is a block diagram illustration of two cryptographic systems, A and B, that communicate CDM keys via a strong key distribution channel and communicate CDM-masked data via a weakened privacy channel.

Although a specific embodiment of the invention has been disclosed, it will be understood by those having skill in the art that changes can be made to that specific embodiment without departing from the spirit and the scope of the invention.

Since the development of a Commercial Data Masking algorithm (CDM) and associated CDM-based data privacy services has been preceded by the development of the Data Encryption Algorithm (DEA) and associated DEA-based cryptographic services, e.g., the Common Cryptographic Architecture (CCA) which includes DEA-based data privacy services, a CDM algorithm and set of CDM-based data privacy services are sought that can augment or replace existing DEA-based data privacy services (e.g., in the CCA or in a CCA-complaint cryptographic device) such that CDM keys and DEA keys can be generated and distributed using the same set of DEA-based cryptographic services and the CDM keys and DEA keys can safely co-exist within the same cryptographic network or cryptographic system without DEA keys being weakened or compromised as a result of modifying or extending the cryptographic system to include a CDM algorithm and set of CDM-based data privacy services.

FIG. 1 is a block diagram illustration of the three types of cryptographic systems, red, green, and yellow, which may exist within a single cryptographic network. A red cryptographic system has cryptographic services consisting of DEA-based key management services, DEA-based Personal Identification Number Processing services, DEA-based data integrity services, and DEA-based data privacy services 1. A green cryptographic system has cryptographic services consisting of DEA-based key management services, DEA-based Personal Identification Number Processing services, DEA-based data integrity services, and CDM-based data privacy services 2. A yellow cryptographic system has cryptographic services consisting of DEA-based key management services, DEA-based Personal Identification Number Processing services, DEA-based data integrity services, DEA-based data privacy services 1, and CDM-based data privacy services 2. The DEA-based cryptographic services may be the cryptographic services defined by the Common Cryptographic Architecture (CCA) Cryptographic API, see *Common Cryptographic Architecture Cryptographic Application Programming Interface*, SC40-1675, IBM Corporation (1990), and which may be implemented using the hardware-level cryptographic instructions described in U.S. Pat. Nos. 4,941,176, 4,918,728, 4,924,514, 4,924,515, 4,993,069, 5,007,089, and patent applications Ser. Nos. 07/596,637, and 07/574,012, cited above. The CDM-based data privacy services may be identical to the DEA-based data privacy services, except they are given different service names and they invoke a CDM algorithm instead of a DEA algorithm.

FIG. 2 is a block diagram that depicts the world divided into two geographical zones, Zone A and Zone B. Zone A includes the United States of America, Canada, and all foreign locations to which red and yellow cryptographic systems containing DEA-based data privacy services can be exported from the United States of America. The reader will appreciate that a precise specification of the allowed foreign locations included in Zone A is not important to the subject invention. Zone B includes all other foreign locations to which green cryptographic systems containing CDM-based data privacy services can be exported from the United States of America. Thus, Zone A contains a set of red cryptographic systems 10 and a set of yellow cryptographic systems 20, whereas Zone B contains a set of green cryptographic systems 30. The intent here is to show that red cryptographic systems must use DEA-based data privacy services when communicating with other red or yellow cryptographic systems, green cryptographic systems must use CDM-based data privacy services when communicating with other green or yellow cryptographic systems, and yellow cryptographic systems can use either DEA-based or CDM-based privacy services depending on whether a yellow system is communicating with another yellow system or with a red or green system. Red cryptographic systems cannot "talk" directly with green cryptographic systems using data privacy services. The reader will also appreciate that several other combinations are possible which are not important to the present discussion. For example, green cryptographic systems could exist within Zone A, although for the purposes of describing the present invention it shall be assumed that the use of a green device in Zone A is handled or covered with a yellow device. In addition, red and yellow cryptographic systems could, in theory, exist in Zone B provided that they are manufactured and shipped from locations outside the United States of America and do not violate U.S. or foreign government regulations. In this regard, FIG. 2 shows the possible arrangement of cryptographic systems (red, yellow and green) that might exist as a result of shipments of cryptographic systems from the United States of America.

The reader will appreciate that a green cryptographic system is produced from a red cryptographic system by replacing the DEA-based data privacy services contained in the set of DEA-based cryptographic services with CDM-based data privacy services and by adding a CDM algorithm to the already present DEA algorithm. A yellow cryptographic system is produced from a red cryptographic system by adding the CDM-based data privacy services to the existing DEA-based cryptographic services and adding a CDM algorithm to the already present DEA algorithm. That is, a red cryptographic system is modified to produce green and yellow cryptographic systems. Since red cryptographic system designs and products already exist within the marketplace, it would be advantageous for the CDM keys associated with the CDM-based data privacy services of a so-produced green or yellow cryptographic system to be generated and distributed using the same set of DEA-based cryptographic services already present in a red cryptographic system. Hence, it would be advantageous for CDM keys to have the same form and length as DEA keys so that for practical purposes a CDM key looks exactly like a DEA key. This then would guarantee that CDM keys could be generated and distributed using the existing key management services already designed, developed and present in red cryptographic systems.

FIG. 3 is a block diagram illustration of two cryptographic systems, A and B, that communicate CDM keys via a strong key distribution channel 50 and communicate CDM-masked data via a weakened privacy channel 60. Cryptographic system A contains a strong key distribution system 100 and a CDM Subsystem 104 containing a CDM Encipher Service 105 and a CDM Decipher Service 106. Cryptographic system B contains a like strong key distribution system 200 and a like CDM Subsystem 204 containing a CDM Encipher Service 205 and a CDM Decipher Service 206. Either cryptographic system can mask data and send it to the other.

FIG. 3 illustrates the case where cryptographic system A acts as a sending device and cryptographic system B acts as a receiving device. That is, A masks data, sends it to B, and B unmask the data. To accomplish this, a CDM key K is first distributed from cryptographic system A to cryptographic system B. This step consists of providing CDM key K to strong key distribution system 100 which sends the CDM key via strong key distribution channel 50 to strong key distribution system 200 at cryptographic system B. Although not specifically shown, strong key distribution channel 50 can be an encryption channel wherein the CDM key K is encrypted under a key-encrypting key shared between cryptographic systems A and B, which is installed as part of a system initialization step. In this case, K is encrypted under the said key-encrypting key at cryptographic system A in strong key distribution system 100 and decrypted under the said key-encrypting key at cryptographic system B in strong key distribution system 200. Cryptographic systems A and B may also make use of a system stored master key, KM. In that case, at cryptographic system A, an encrypted value of K (i.e., encrypted with master key KM) is provided to strong key distribution system 100 and to CDM Encipher Service 105. Strong key distribution system 100 then re-enciphers K from encipherment under the master key to encipherment under the common key-encrypting key shared with cryptographic system B. Likewise, at cryptographic system B, the received encrypted value of K is decrypted with B's copy of the same key-encrypting key and re-encrypted with B's master key. Furthermore, the processes of encryption with the master key and with the mentioned key-encrypting key can make use of control vectors in order to provide key separation and key usage control. A specification of the control vector and control vector encryption and decryption algorithms are described in U.S. Pat. Nos. 4,941,176, 4,918,728, 4,924,514, 4,924,515, 4,993,069, 5,007,089, and patent applications Ser. Nos. 07/596,637, and 07/574,012, cited above.

At cryptographic system A, an encrypted or clear value of K and clear data (i.e., the data to be sent to cryptographic system B) are provided as inputs to a CDM Encipher Service 105 in CDM Subsystem 104. If necessary, CDM Encipher Service 105 decrypts K with the master key. The clear CDM key K and clear data are then used by CDM Encipher Service 105 to mask the data using a masking process. The so-produced masked data is transmitted via weakened privacy channel 60 to cryptographic system B. Weakened privacy channel 60 is called a weakened channel because it transmits masked data produced with a CDM algorithm, which is designed to be weaker than the DEA.

At cryptographic system B, the so-recovered encrypted or clear value of K and the so-received masked data are provided as inputs to a CDM Decipher Service 206 in a corresponding CDM Subsystem 204. If necessary, CDM Decipher Service 206 decrypts K with the master key. The clear CD key K and masked data are then used by CDM Decipher Service 206 to unmask data using an unmasking process. The so-produced unmasked or clear data is returned as an output.

Figure 4:
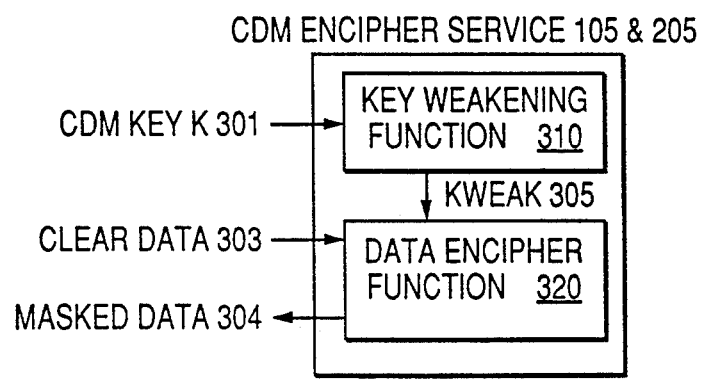
FIG. 4 is a block diagram illustration of CDM Encipher Service 105, which is identical to CDM Encipher Service 205.

FIG. 4 is a block diagram illustration of CDM Encipher Service 105, which is identical to CDM Encipher Service 205. CDM Encipher Service 105 consists of a key weakening function 310 and an Encipher Function 320. To mask data with CDM Encipher Service 105, a CDM key K is supplied to CDM Encipher Service 105 at 301 and clear data is supplied to CDM Encipher Service 105 at 303. In response, CDM Encipher Service 105 first passes the supplied value of K to a key weakening function 310, which produces a weakened key, Kweak, at 305. The so-produced weakened key, Kweak, at 305, and the input clear data at 303 are passed to Data Encipher Function 320, which causes the input clear data at 303 to be enciphered with Data Encipher Function 320. The so-produced enciphered or masked data is returned as an output at 304. The reader will appreciate that the clear CDM key K supplied at 301 could instead be an encrypted CDM key, e.g., a CDM key encrypted with the master key or with the master key and a control vector as described in U.S. Pat. Nos. 4,941,176, 4,918,728, 4,924,514, 4,924,515, 4,993,069, 5,007,089, and patent applications Ser. Nos. 07/596,637, and 07/574,012, cited above. In either case, an encrypted CDM key must first be decrypted by CDM Encipher Service 105 before it can be used. Although not specifically show, such a decryption means could easily be provided in CDM Encipher Service 105.

Figure 5:
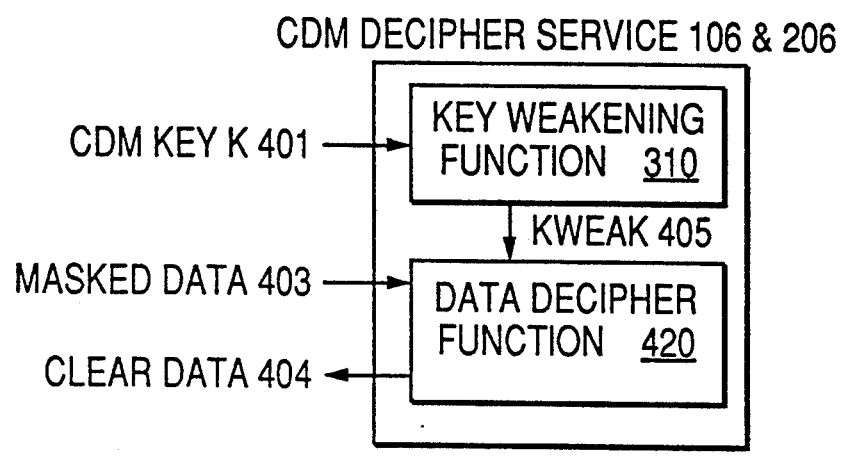
FIG. 5 is a block diagram illustration of CDM Decipher Service 106, which is identical to CDM Decipher Service 206.

FIG. 5 is a block diagram illustration of CDM Decipher Service 106, which is identical to CDM Decipher Service 206. CDM Decipher Service 106 consists of a key weakening function 310 and a Decipher Function 420. To unmask data with CDM Decipher Service 106, a CDM key K is supplied to CDM Decipher Service 106 at 401 and masked data is supplied to CDM Decipher Service 106 at 403. In response, CDM Decipher Service 106 first passes the supplied value of K to a key weakening function 310, which produces a weakened key, Kweak, at 405. The so-produced weakened key, Kweak, at 405, and the input masked data at 403 are passed to Data Decipher Function 420, which causes the input masked data at 403 to be deciphered with Data Decipher Function 420. The so-produced clear or unmasked data is returned as an output at 404. The reader will appreciate that the clear CDM key K supplied at 401 could instead be an encrypted CDM key, e.g., a CDM key encrypted with the master key or with the master key and a control vector as described in U.S. Pat. Nos. 4,941,176, 4,918,728, 4,924,514, 4,924,515, 4,993,069, 5,007,089, and patent applications Ser. Nos. 07/596,637, and 07/574,012, cited above. In either case, an encrypted CDM key must first be decrypted by CDM Decipher Service 106 before it can be used. Although not specifically show, such a decryption means could easily be provided in CDM Decipher Service 106.

Figure 6:
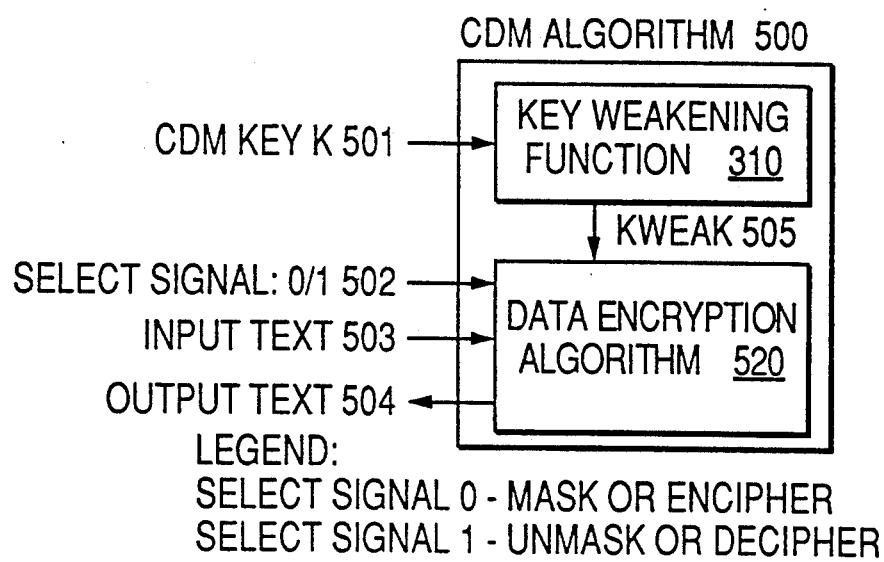
FIG. 6 is a block diagram illustration of CDM algorithm 500 consisting of a key weakening function 310 and a Data Encryption Algorithm 520.

FIG. 6 is a block diagram illustration of CDM algorithm 500 consisting of a key weakening function 310 and a Data Encryption Algorithm 520. Key weakening function 310 is identical to the key weakening function of FIG. 4 and FIG. 5. The inputs to CDM algorithm 500 consist of a clear CDM key K at 501, a select signal specifying encipher (select signal=0) or decipher (select signal=1) at 502, and a input text to be enciphered or deciphered at 503. The so-produced enciphered or deciphered output text is returned by CDM algorithm 500 at 504. In response to a select signal to encipher or decipher text at 502, the clear CDM key K at 501 is passed as an input to key weakening function 310, which produces a weakened key, Kweak, at 505. The so-produced weakened key, Kweak, at 505, the input select signal at 502, and the input text at 503 are passed to Data Encryption Algorithm 520, which causes the input text at 503 to be enciphered (select signal=0) or deciphered (select signal=1) with the weakened key, Kweak, at 505 using Data Encryption Algorithm 520. The so-produced enciphered or deciphered text is returned as an output at 504.

The reader will appreciate that different modes of DEA encryption exist and that Data Encryption Algorithm 520 in FIG. 6 could implement any one of these different modes. For example, Data Encryption Algorithm 520 could implement the Electronic Code Book (ECB) mode of DEA encryption, in which case the length of the input and output data is constrained to be 8 bytes. For purposes of illustration, it shall be assumed that Data Encryption Algorithm 520 implements the ECB mode of DEA encryption. Data Encryption Algorithm 520 could instead implement the Cipher Block Chaining (CBC) mode of DEA encryption, in which case the length of the input and output data is constrained to be a multiple of 8 bytes. In this case, two additional inputs must be specified to CDM algorithm 107: (a) a length parameter indicating the length of the input data in 8-bytes blocks, and (b) an 8-byte initial chaining value. The CBC mode of DEA encryption, including a description of how the initial chaining value is used, is described in U.S. Pat. No. 4,918,728, cited above.

Figure 7:
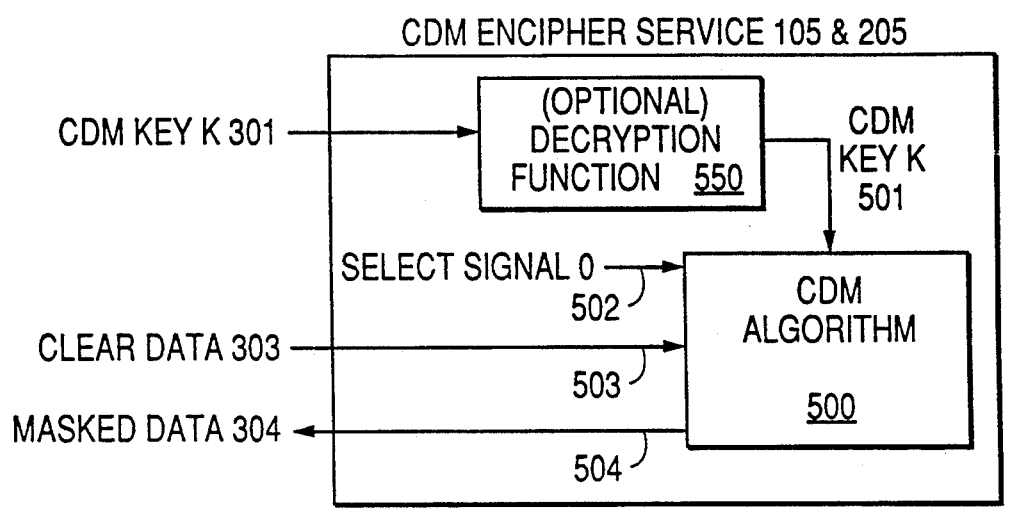
FIG. 7 is a block diagram illustration of an alternate embodiment of CDM Encipher Service 105, which is identical to CDM Encipher Service 205.

FIG. 7 is a block diagram illustration of an alternate embodiment of CDM Encipher Service 105, which is identical to CDM Encipher Service 205. The alternate embodiment of FIG. 7 incorporates an optional decryption function 550 and a CDM Algorithm 500. CDM algorithm 500 is the same CDM algorithm 500 shown in FIG. 6. The CDM key K at 301, if encrypted, is decrypted with decryption function 550 to produce an output clear CDM key K at 501. For example, the CDM key K at 301 might be encrypted with a master key KM stored within the secure hardware of the cryptographic system, as describe above. Otherwise, if CDM key K at 301 is a clear CDM key, then CDM key K at 501 is set equal to the clear CDM key K at 301. The CDM Encipher Service 105 next specifies a select signal=0 to CDM Algorithm 500, in order to request a masking operation. CDM Encipher Service 105 passes the so-produced clear CDM key K at 501 to CDM Algorithm 500 and it reads clear data at 303 and passes it at 503 to CDM Algorithm 500. In response, CDM Algorithm 500 uses a masking process to produce masked data from the input clear data, which it returns at 504 to CDM Encipher Service 105. In turn, CDM Encipher Service 105 returns masked data as an output at 304.

Figure 8:
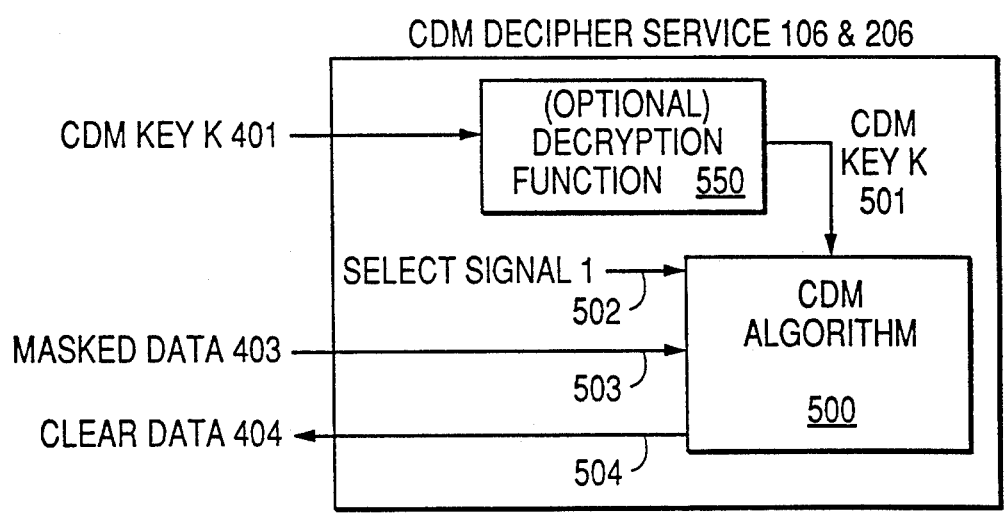
FIG. 8 is a block diagram illustration of an alternate embodiment of CDM Decipher Service 106, which is identical to CDM Decipher Service 206.

FIG. 8 is a block diagram illustration of an alternate embodiment of CDM Decipher Service 106, which is identical to CDM Decipher Service 206. The alternate embodiment of FIG. 8 incorporates an optional decryption function 550 and a CDM Algorithm 500. CDM algorithm 500 is the same CDM algorithm 500 shown in FIG. 6. The CDM key K at 401, if encrypted, is decrypted with decryption function 550 to produce an output clear CDM key K at 501. For example, the CDM key K at 401 might be encrypted with a master key KM stored within the secure hardware of the cryptographic system, as describe above. Otherwise, if CDM key K at 401 is a clear CDM key, then CDM key K at 501 is set equal to the clear CDM key K at 401. The CDM Decipher Service 106 next specifies a select signal=1 to CDM Algorithm 500, in order to request an unmasking operation. CDM Decipher Service 106 passes the so-produced clear CDM key K at 501 to CDM Algorithm 500 and it reads masked data at 403 and passes it at 503 to CDM Algorithm 500. In response, CDM Algorithm 500 uses an unmasking process to produce clear data from the input masked data, which it returns at 504 to CDM Decipher Service 106. In turn, CDM Decipher Service 106 returns clear data as an output at 404.

Figure 9:
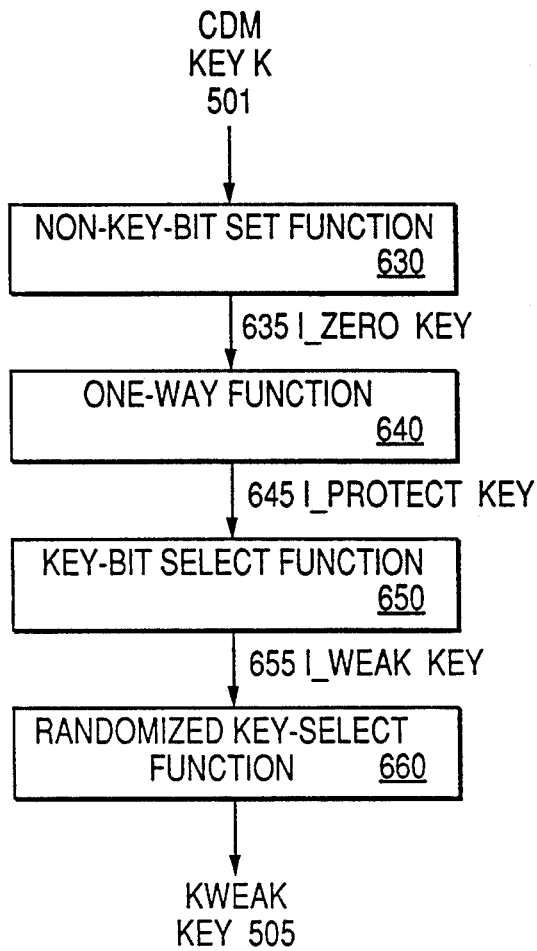
FIG. 9 is a block diagram illustration of the preferred embodiment of key weakening function 310 consisting of a non-key-bit set function 630, one-way function 640, key-bit select function 650, and randomized key-select function 660.

FIG. 9 is a block diagram illustration of the preferred embodiment of key weakening function 310 consisting of a non-key-bit set function 630, one-way function 640, key-bit select function 650, and randomized key-select function 660. A CDM key K is processed by key weakening function 310 as follows. CDM key K is passed at 501 to non-key-bit set function 630. In response, non-key-bit set function 630 sets the non-key bits in K to a predetermined constant and the resulting intermediate key, I_zero, is output at 635. For example, a 64-bit CDM key consisting of 56 independent key bits and 8 non-key bits (at bit positions 7, 15, 23, 31, 39, 47, 55, and 63, where bits are counted as 0, 1, ..., 63 from most significant bit position to least significant bit position) could be set to zero. That is, the 8 non-key bits that may be used for parity checking are set to zero bits. Setting the non-key bits to a predetermined constant value ensures a level of compatibility between cryptographic systems implementing the CDM Encipher and CDM Decipher Services. For example, when a CDM key is generated in one system, the key may be adjusted for odd parity. In another system, a generated key may not be adjusted for odd parity. Likewise, when a key is imported into one system, the key may be adjusted for odd parity, whereas when a key is imported into another system, the key may not be adjusted for odd parity. Since one cannot be sure that all like CDM keys will be guaranteed to have the same parity setting, it is best to design the CDM algorithm to operate correctly under all conditions of key parity setting. Thus, in the preferred embodiment the key parity bits are set to a predetermined constant value before the key is further processed. This ensures that all CDM keys will be compatible regardless of how key parity may be handled among different systems.

Figure 10:
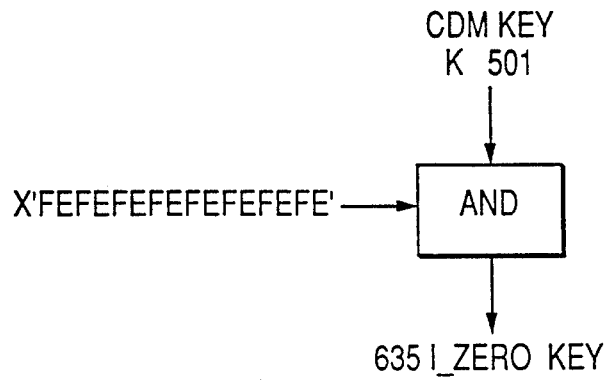
FIG. 10 is a block diagram illustration of an example non-key-bit set function 630 that sets the 8 non-key bits in a 64-bit CDM key to zero to produce a 64-bit output key, I_zero.

FIG. 10 is a block diagram illustration of an example non-key-bit set function 630 that sets the 8 non-key bits in a 64-bit CDM key to zero to produce a 64-bit output key, I_zero. More particularly, the method of FIG. 10 combines the input CDM key, K, at 501, with the constant X'FEFEFEFEFEFEFEFE' using an arithmetic AND operation to produce the output key, I_zero, at 635. In effect, the AND operation causes the 8 non-key bits at bit locations 7, 15, 23, 31, 39, 47, 55, and 63 in the key to be set to zero. Those skilled in the art will recognize that a CDM key may or may not have non-key bits, in which case a non-key-bit set function 630 may or may not be required in the preferred embodiment. Moreover, the non-key bits if they exist can be in different bit positions in the key depending on the cryptographic algorithm in which they are ordinarily used. In the case of the Data Encryption Algorithm, there are 8 non-key bits and these bits are in bit positions 7, 15, 23, 31, 39, 47, 55, and 63. Thus, the reader will appreciate that the method of FIG. 10 is applicable to CDM keys that are identical to DEA keys, i.e., a 64-bit key with 8 non-key bits in bit positions 7, 15, 23, 31, 39, 47, 55, and 63. The use of the 8 non-key bits of a DEA key for parity checking has been widely discussed in the literature, see for example U.S. Pat. No. 4,941,176 which describes a method for adjusting a key for odd key parity. However, forcing the parity bits of a key to a predetermined constant value as part of a process of weakening a key is not taught in the prior art.

Referring again to FIG. 9, the so-produced intermediate key I_zero at 635 is input to one-way function 640. In response, one-way function 640 processes the input key I_zero to produce an intermediate protected key, I_protect, at 645. One-way function 640 is such that given the value of I_protect, it is computationally infeasible to derive the value of I_zero, and hence it is infeasible to derive the independent key bits in CDM Key K at 501. That is, one cannot invert one-way function 640 to compute an input key value from an output key value. Those skilled in the art will recognize that if the intent is to construct a CDM algorithm that need not co-exist with a DEA algorithm and if the intent is not to use DEA-based key management services to generate and distribute CDM keys throughout a communication network and if there is no need to protect the secrecy of DEA keys because none exist in the contemplated network where the CDM algorithm will operate, then there is no real need for one-way function 640. In this case, one-way function 640 can be omitted from weakening function 310. However, for the present invention, one-way function 640 is considered a requirement.

FIG. 11 is a block diagram illustration of an example one-way function that maps a 64-bit input key, I_zero, to a 64-bit output key, I_protect. More particularly, the method of FIG. 11 encrypts a 64-bit input key, I_zero, at 635, with a predetermined constant key whose value is X'0123456789ABCDEF' using the Data Encryption Algorithm to produce an intermediate ciphertext, C. The intermediate ciphertext, C, is then Exclusive-ORed with the input key, I_zero, at 635, to produce an output key, I_protect, at 645. The reader will appreciate that the method of FIG. 11 can operate in combination with the method of FIG. 10, and therefore handles the case where CDM keys are identical to DEA keys.

U.S. Pat. No. 4,908,861 to Brachtl discloses a method for calculating a one-way function of an input. The method makes use of a simple kernel function consisting of (a) an encryption step in which a 64-bit input is encrypted with a fixed key to produce a output ciphertext and (b) an Exclusive-OR step in which the 64-bit input is Exclusive ORed with the ciphertext produced in the encryption step to produce a 64-bit output. The kernel function provides a very simple one-way function that can be used as a building block in designing much stronger one-way functions. Those skilled in the art will recognize that a one-way function can be omitted from weakening function 310 is the CDM algorithm is not implemented together with a DEA algorithm and when there is no need for CDM keys to co-exist with DEA keys in the same network. One-way function 640 could also be omitted from key weakening function 310 if other means are used to tag and distinguish CDM keys from DEA keys, but this is not the approach taken by the present invention. The present invention contemplates exactly the opposite case, and therefore one-way function 640 is considered a necessary part of key weakening function 310.

Referring again to FIG. 9, the so-produced intermediate protected key, I_protect, at 645 is input to key-bit select function 650. In response, key-bit select function 650 processes the input key, I_protect, to produce an intermediate weakened key, I_weak, at 655. Key-bit select function 650 processes the input key, I_protect, by selecting a subset of the bits in I_protect and storing them in the intermediate weakened key, I_weak. The remaining bits in I_weak are set to a predetermined constant. Those skilled in the art will recognize that any subset of the bits in the input key, I_protect, can be selected and stored at any bit positions in the output key, I_weak, and the remaining bits in the output key, I_weak, can be set to any predetermined constant. Thus, there are many different ways in which the output key, I_weak, can be derived from the input key, I_protect. As the reader can see, key-bit select function 650 is the critical part of key weakening function 310 that actually weakens the key. The reader will also appreciate that while key-bit select function 650 is described as a bit selection process, it could instead be described as a bit fixing process. In this case, a subset of bits in I_protect are fixed to a predetermined constant value to produce a weakened key value, I_weak. In effect, bit fixing is a special case of the already described method of selecting key bits. U.S. Pat. No. 4,908,861 to Brachtl discloses a method of fixing bits in a cryptographic key. The bits in a first 64-bit key are set to B'10' and the bits in a second 64-bit key are set to B'01'. This is done to ensure that the first and second keys cannot be the same, even if the remaining 54 key bits in each respective key happen to be the same. However, U.S. Pat. No. 4,908,861 does not teach a method of fixing bits in a key for the purpose of weakening the key.

FIG. 12 is a block diagram illustration of an example key-bit select function 650 that produces a 64-bit intermediate weakened key, I_weak, from a 64-bit intermediate protected key, I_protect. More particularly, the method of FIG. 12 sets the bits at 40 predetermined bit locations in the output key, I_weak, equal to the bit values in the corresponding bit locations in the input key, I_protect. This is accomplished by combining the input key, I_protect, with a predetermined constant value X'FEFEFEFEFEF80000' using an arithmetic AND operation, which causes the 8 parity bits (bit locations 7, 15, 23, 31, 39, 47, 55, and 63) and 16 key bits (bit locations 45, 46, 48 thru 54, and 56 thru 62) in I_weak to be set equal to zero. This produces a 64-bit key, I_weak, with 40 independent key bits. This creates a key space with $2^{**}40$ possible keys. In this case, the method of FIG. 12 can operate in combination with the methods of FIG. 10 and FIG. 11, and therefore handles the case where CDM keys are identical to DEA keys.

Referring again to FIG. 9, the so-produced intermediate weakened key, I_weak, at 655 is input to randomized key-select function 660. In response, randomized key-select function 660 processes the input key, I_weak, to produce a final weakened key, Kweak, at 505. Randomized key-select function 660 processes the input key, I_weak, by randomly mapping each possible value of I_weak to a corresponding value in a larger space of key values. The larger space of key values is just the set of keys belonging to or defined to the cryptographic algorithm to be used for encrypting with the so-produced weakened key, Kweak. For example, if Kweak is processed by the Data Encryption Algorithm, then Kweak is a 64-bit key identical to a DEA key and Randomized Key Select Function 660 randomly selects a subset of key values from the $2^{**}56$ possible key values. Randomized key-select function 660 could consist of a step of encrypting I_weak with a predetermined key value using the DEA, where the output ciphertext is defined to be the weakened key, Kweak. Those skilled in the art will recognize that other mapping functions are possible. A method for generating random numbers is taught by Meyer and Matyas in their book entitled Cryptography—A New Dimension in Computer Data Security, John Wiley & Sons, 1982. On p. 315 of their book, Meyer and Matyas describe a method of key generation based on encrypting an incrementing counter with a single DEA key. The basic idea of the random number generation process is that an incrementing counter of adequate size, that doesn't repeat, will produce random looking keys of unknown value if the counter value is encrypted with a predetermined constant secret key using the Data Encryption Algorithm. However, prior art does not teach a method for producing random numbers using a secret counter value consisting of the fixed part and a variable part and which is encrypted with a predetermined constant key whose cryptographic strength does not require the predetermined constant key to be kept secret. In effect, the values of I_weak are highly structured, since they consist of a variable part and a fixed part. Randomized key-select function 660 serves the purpose of mapping a highly structured subset of key values into a highly non-structured (or random) subset of key values. The prior art does not teach a method for mapping a highly structured key space into a randomized or highly non-structured key space where the highly structured key space is a space of weakened keys.

FIG. 13 is a block diagram illustration of an example randomized key-select function 660 that produces a 64-bit weakened key, Kweak, from a 64-bit intermediate weakened key, I_weak. More particularly, the method of FIG. 13 encrypts a 64-bit input key, I_weak, with a predetermined constant key X'FEDCBA9876543210' to produce a 64-bit ciphertext which is defined to be an output weakened key, Kweak. The value of the predetermined constant key X'FEDCBA9876543210' used in the randomized key-select function 660 is different from the value of the predetermined constant key X'0123456789ABCDEF' used in the one-way function 640, although these predetermined constant key values could be the same. Those skilled in the art will recognize that many variations in the selection of values for the predetermined constant keys are possible, and that the selection of one value over another does not depart from the spirit of the invention. In this case, the method of FIG. 13 can operate in combination with the methods of FIG. 10, FIG. 11, and FIG. 12, and therefore handles the case where CDM keys are identical to DEA keys.

Figure 14:
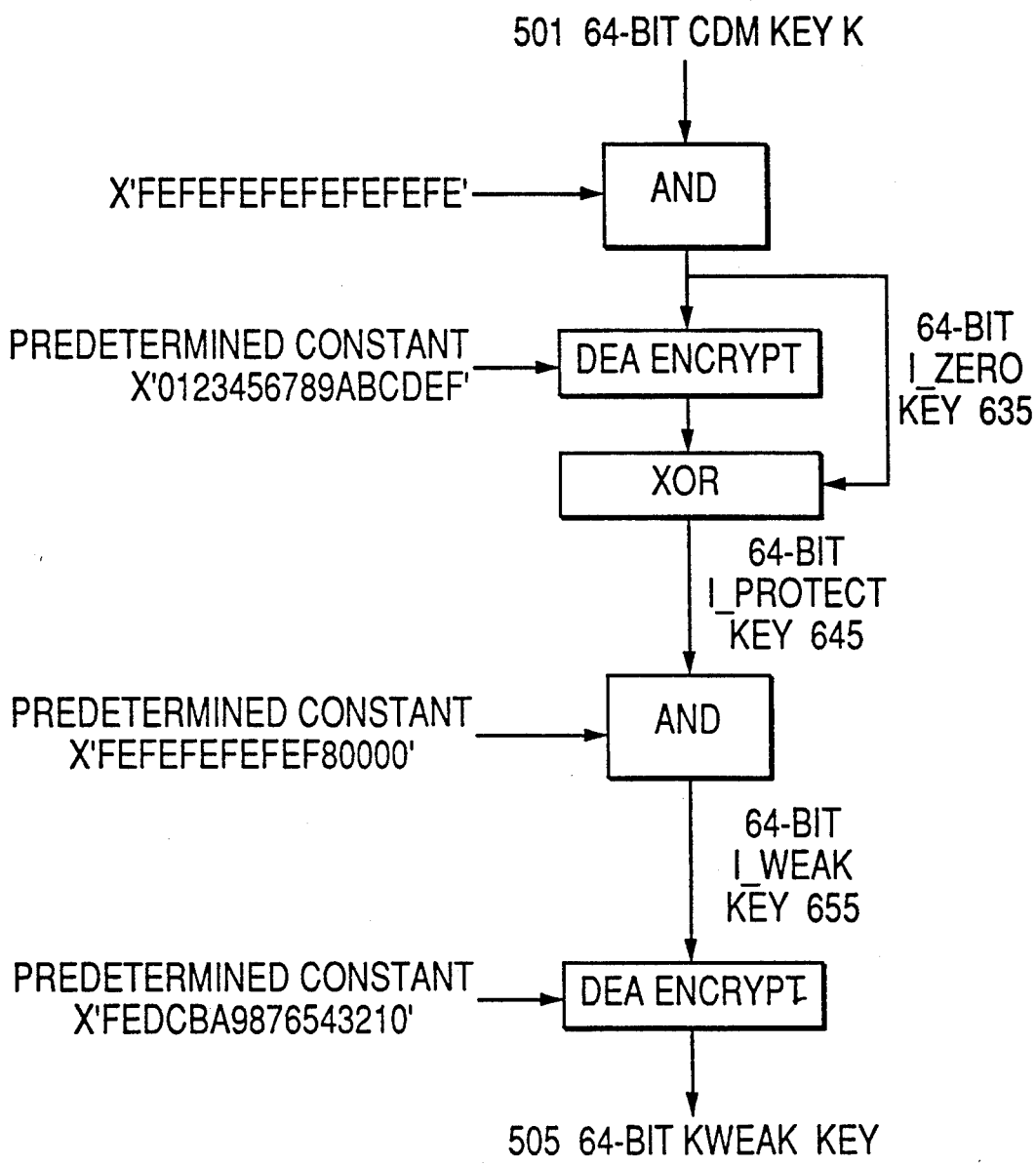
FIG. 14 is a block diagram illustration of an example key weakening function 310 based on the methods described in FIG. 10, FIG. 11, FIG. 12, and FIG. 13.

FIG. 14 is a block diagram illustration of an example key weakening function 310 based on the methods described in FIG. 10, FIG. 11, FIG. 12, and FIG. 13. The method of key weakening is applicable to a 64-bit CDM key that is used to produce a 64-bit weakened key, Kweak, and which is intended to operate with the Data Encryption Algorithm as illustrated in FIG. 6.

Those skilled in the art will recognize that in the cryptographic system employing both a DEA algorithm and a CDM algorithm, that certain space saving economies can be gained. For example, the CDM algorithm of FIG. 6 could be modified in a way that it could service both as a CDM algorithm and a DEA algorithm. This could be done providing an additional algorithm select signal, 0 or 1, where 0 means select the DEA algorithm and 1 means select the CDM algorithm. In effect, algorithm select signal 0 would cause the input key to be routed directly to the Data Encryption Algorithm 520, bypassing the Key Weakening Function 310, whereas algorithm select signal 1 would cause the input key to be routed to Key Weakening Function 310 as shown in FIG. 6. In this way, the cryptographic system could provide a level of selective encryption, either CDM-based encryption or DEA-based encryption.

Those skilled in the art will also recognize that a limited form of compatibility can be achieved between a red cryptographic system and a green cryptographic system, where the green cryptographic system is additionally provided with an externalized version of Key Weakening Function 310, i.e., if the green cryptographic system can invoke a cryptographic service that will weaken a CDM key and return the weakened key, Kweak, to the application. For practical purposes, the weakened key, Kweak, would be returned in encrypted form, e.g., under of the encryption of a master key or under the encryption of a variant key formed as the Exclusive OR product of a master key and a control vector as described in U.S. Pat. Nos. 4,941,176, 4,918,728, 4,924,514, 4,924,515, 4,993,069, 5,007,089, and patent applications Ser. Nos. 07/596,637, and 07/574,012, cited above. In such an encrypted form, the key could then be sent from the green cryptographic system to the red cryptographic system via strong key distribution channel 50, as illustrated in FIG. 3. At the red cryptographic system, the weakened key, Kweak, would be used with the existing DEA-based privacy services to encipher and decipher data. At the green cryptographic system, the original CDM key is used with the CDM-based privacy services to encipher and decipher data. This method of communication requires that the green cryptographic system service a weakened key, Kweak, to the red cryptographic system, since it is the red cryptographic system that is assumed to already exist and it is the green cryptographic system that is assumed to be new. The existing system is the one that cannot be changed in the scenario.

Those skilled in the art will recognize that the present invention could be practiced using any block cipher cryptographic algorithm. For example, one could practice the invention using a new or replacement Data Encryption Algorithm with key lengths that are the same or different from the present Data Encryption Algorithm. Thus, if the ke size of a replacement DEA is 128 bits instead of 64 bits, then the present invention could be practiced using a key weakening function 310 that transforms a 128-bit CDM key into a 128-bit weakened key, Kweak. In that case, the replacement DEA keys and the CDM keys are generated and distributed using the same set of key management services, except that these new key management services must be designed to handle 128-bit keys instead of the present 64-bit keys. Those skilled in the art will recognize that key weakening function 310 shown in FIG. 9 is already a general function that does not depend on a particular key length of cryptographic algorithm. The example of key weakening function 310 shown in FIG. 14 specifically addresses 64-bit CDM keys and 64-bit weakened keys. The reader will appreciate that the example in FIG. 14 could be extended to handle 128-bit keys. This could be done by ANDing a constant X'FEFEFEFEFEFEFEFEFEFEFEFEFEFEFEFE' with the input CDM key to set the non-key bits to zero. The assumption is made that the non-key (or parity bits) are in bit locations 7, 15, 23, . . . , 127 (i.e., every 8th bit). Of course if the non-key bits are in different locations, then a different constant must be ANDed with the key, and if there are no non-key bits than this step can be omitted. Continuing with the discussion, the so-produced 128-bit key I_zero could then be encrypted with a predetermined constant key X'0123456789ABCDEF0123456789ABCDEF' instead of the predetermined constant key X'0123456789ABCDEF', otherwise the one-way function remains the same. The so-produced 128-bit key I_protect could then be ANDed with the predetermined constant X'FEFEFEFEFEFEFEFEFEFEFEFEFEFEF80000' instead of predetermined constant X'FEFEFEFEFEF80000'. This of course, weakens the key by 16 bits, which may or may not be enough. In any event, the reader will appreciate that this is only an example, and that a different predetermined constant could be used to weaken the key by any number of desired bits. The so-produced 128-bit key I_weak could then be encrypted with predetermined constant X'FEDCBA9876543210FEDCBA9876543210' to produce the final 128-bit weakened key, Kweak.

While the preferred embodiment of the present invention has been shown and described in detail, it should be apparent to those of ordinary skill in the art that various adaptations and modifications may be made without departing from the scope of the invention. The present invention is intended to cover all such adaptations and modifications that fall within the scope of the present invention as defined in the appended claims.

What is claimed is:

1. In a data processing network, a system for transmitting commercially masked data from a sending location to a receiving location, comprising:

a first strong key distribution system at the sending location for managing the distribution of strong cryptographic keys;

a second strong key distribution system at the receiving location for managing the distribution of strong keys;

a strong key distribution channel coupled between said first strong key distribution system in the said sending location and said second strong key distribution system in said receiving location, for exchanging strong keys;

a first commercial data masking subsystem coupled to said first strong key distribution system at said sending location, which comprises:

a first weakening function means having an input coupled to said first strong key distribution system, for receiving a strong key;

said first weakening function means transforming said strong key into a weakened key;

an encryption function means having a key input coupled to said output of said first weakening function means and a data input coupled to a source of data to be masked;

a second commercial data masking subsystem having an input coupled to said second strong key distribution system at said receiving location, which further comprises:

a second weakening function means having an input coupled to said second strong key distribution system for receiving a strong key;

said second weakening function means transforming said strong key into a weakened key;

a decryption function means having a key input coupled to said output of said second weakening function means, and a data input, for receiving masked data transmitted over a weakened data privacy channel coupled to said output of said encryption function means at said sending location and said input of said decryption function means at said receiving location, for decrypting said masked data using said weakened key, to recover said data in clear text form; and said weakened data privacy channel coupled to said first commercial data masking subsystem at said sending location and said second commercial data masking subsystem at said receiving location.

2. The system of claim 1 which further comprises:

a first one-way function means having an input coupled between said output of said first strong key distribution system and said input of said first weakening function means in said first commercial data masking subsystem, for performing a one-way transformation of said strong key, said transformed expression being input to said first weakening means function;

a second one-way function means connected between said output of said second strong key distribution system at said receiving location and said input of said second weakening function means in said second commercial data masking subsystem, for performing a corresponding transformation of said strong key output from said second strong key distribution system, to apply a transformed expression to said input of said second weakening function means.

3. The system claim 1, which further comprises:
transmitting means coupled to said first strong key distribution system at said sending location for transmitting a strong key over a strong key distribution channel to said input of said second strong key distribution system at said receiving location;
said strong key also being output from said first strong key distribution system to said input of said first weakening function means at said sending location in said first commercial masking subsystem;
said strong key transmitted over said strong key distribution channel being transferred from said input of said second strong key distribution system to said output thereof for application to said input of said second weakening function means at said receiving location in said second commercial data masking subsystem.

4. The system of claim 1, which further comprises:
a strong key encryption means having an input coupled to said output of said first strong key distribution system, for encrypting a strong key to be transmitted over a strong key distribution channel to said receiving location;
a strong key decryption means having an input coupled to said strong key distribution channel and an output coupled to said input of said second strong key distribution system, for decrypting said strong key prior to its application to said input of said second weakening function means in said second commercial data masking subsystem.

5. The system of claim 1, which further comprises:
said strong key at said first key distribution system being stored encrypted under a master key.

6. The system claim 1, which further comprises:
said encryption function means in said first commercial data masking subsystem at said sending location performing a data encryption algorithm encryption operation; and
said decryption function means in said second commercial data masking subsystem at said receiving location, performing a data encryption algorithm decryption operation.

7. The system of claim 1, which further comprises:
a first one-way function means having an input coupled between said output of said first strong key distribution system at said sending location and said input of said first weakening function means in said first commercial data masking subsystem;
said first one-way function means including a data encryption algorithm and a cipher function having an input coupled to said output of said first strong key distribution system, a key input for receiving a fixed key, and an output coupled to an exclusive-or multiplier, said output from said first key distribution system also being coupled to a second input of said exclusive-or multiplier, the output of said exclusive-or multiplier being coupled to said input to said first weakening function means;

said second one-way function means including a data encryption algorithm and a cipher function having an input coupled to said output of said second strong key distribution system, a key input for receiving a fixed key, and an output coupled to an exclusive or multiplier, said output from said second key distribution system also being coupled to a second input of said exclusive-or multiplier, the output of said exclusive-or multiplier being coupled to said input to said second weakening function means;

whereby a one-way transformed key expression can be applied to said first weakening function means in said first commercial data masking subsystem and to said second weakening function means in said second commercial data masking subsystem.

8. The system of claim 7, wherein non-key bits in said strong key output from said first key distribution system are set to a constant value.

9. The system of claim 7, wherein said first weakening function means further comprises:
means for setting a subset of the 64 bits in the transformed key expression output from said first one way function means, to a predetermined constant value, to obtain said weakened key.

10. The system of claim 7, which further comprises:
wherein said first weakening function means includes means to set a predetermined subset of the 64 bit input thereto, to a predetermined constant value;
a randomization encryption means which includes a data encryption algorithm enciphering function having an input coupled to a receive said output from said first weakening function means, and which has a second fixed key input, and which has an output coupled to said input of said encryption function means in said first commercial data masking subsystem.

11. The system of claim 1, wherein a first switch means is incorporated at said output of said first strong key distribution system, to direct said strong key directly to said key input of said encryption function means in said first commercial data masking subsystem, to provide strong key encryption selectively.

12. The system of claim 11, which further comprises:
a second switch means coupled between the said output of said second strong key distribution system in said receiving location, and said key input of said decryption function means in said second commercial data masking subsystem, to provide strong key decryption, selectively.

13. The system of claim 1, which further comprises:
said second commercial data masking subsystem at said receiving location obtaining a strong key from said second key distribution system and performing a weakening transformation in said second commercial data masking subsystem, producing a weakened key;
said weakened key generated at said receiving location, being transmitted over said strong key distribution channel to said sending location for input as the key value to said encryption function;
said encryption function means in said first commercial data masking subsystem in said sending location, masking data by applying said source of data to a data input of said encryption function means, producing a masked data stream;

said masked data stream being transmitted from said sending location over said weakened data privacy channel to said receiving location for application to said input to said decryption function means in said second commercial data masking subsystem;

said weakened key being applied by said second weakening function means to said key input to said decryption function means, to recover the clear text form of said data;

whereby said weakened key is originated at said receiving location.

14. The system of claim 13, wherein said first commercial data masking subsystem generates said weakened key which is then transmitted over said stronger key distribution channel to said decryption means in said receiving location for use as a key to decrypt the mask data transmitted over said weaker data privacy channel.

15. The system of claim 7, wherein said first weakening function means further comprises:

means for selecting a subset of the 64 bits in the transformed key expression output from said first one way function means to obtain said weakened key.

16. The system of claim 7, which further comprises:

wherein said first weakening function includes means for selecting a subset of the 64 bits in the transformed key expression output from said first one way function means to obtain said weakened key;

a randomization encryption means which includes a data encryption algorithm enciphering function having an input coupled to a receive said output from said first weakening function means, and which has a second fixed key input, and which has an output coupled to said input of said encryption function means in said first commercial data masking subsystem.

17. In a data processing network, including a first strong key distribution system at the sending location for managing the distribution of strong cryptographic keys, a second strong key distribution system at the receiving location for managing the distribution of strong keys, a strong key distribution channel coupled between said first strong key distribution system in the said sending location and said second strong key distribution system in said receiving location, for exchanging strong keys, a first commercial data masking subsystem coupled to said first strong key distribution system at said sending location, and a second commercial data masking subsystem coupled to said second strong key distribution system at said receiving location, a weakened data privacy channel coupled between said first commercial data masking subsystem and said second commercial data masking subsystem, for exchanging a masked data stream, a method for transmitting commercially masked data from a sending location to a receiving location, comprising the steps of:

receiving a strong key in said first commercial data masking subsystem, from said first strong key distribution system;

transforming said strong key in said first commercial data masking subsystem, into a weakened key;

encrypting with said weakened key in said first commercial data masking subsystem, a data stream, producing a masked data stream;

transmitting said masked data stream from said sending location to said receiving location over said weakened data privacy channel;

receiving a strong key in said second commercial data masking subsystem, from said second strong key distribution system;

transforming said strong key in said second commercial data masking subsystem, into a weakened key;

decrypting with said weakened key in said second commercial data masking subsystem, said masked data stream, producing a clear text data stream.

18. A data processing program, for execution in a data processing network including a first strong key distribution system at the sending location for managing the distribution of strong cryptographic keys, a second strong key distribution system at the receiving location for managing the distribution of strong keys, a strong key distribution channel coupled between said first strong key distribution system in the said sending location and said second strong key distribution system in said receiving location, for exchanging strong keys, a first commercial data masking subsystem coupled to said first strong key distribution system at said sending location, and a second commercial data masking subsystem coupled to said second strong key distribution system at said receiving location, a weakened data privacy channel coupled between said first commercial data masking subsystem and said second commercial data masking subsystem, for exchanging a masked data stream, the data processing program, when executed in said data processing network, performing a method for transmitting commercially masked data from a sending location to a receiving location, comprising the steps of:

receiving a strong key in said first commercial data masking subsystem, from said first strong key distribution system;

transforming said strong key in said first commercial data masking subsystem, into a weakened key;

encrypting with said weakened key in said first commercial data masking subsystem, a data stream, producing a masked data stream;

transmitting said masked data stream from said sending location to said receiving location over said weakened data privacy channel;

receiving a strong key in said second commercial data masking subsystem, from said second strong key distribution system;

transforming said strong key in said second commercial data masking subsystem, into a weakened key;

decrypting with said weakened key in said second commercial data masking subsystem, said masked data stream, producing a clear text data stream.

19. In a data processing network, a system for transmitting commercially masked data from a sending location to a receiving location, comprising:

a first strong key distribution system at the sending location for managing the distribution of strong, symmetric, cryptographic keys;

a second strong key distribution system at the receiving location for managing the distribution of strong, symmetric keys;

a strong key distribution channel coupled between said first strong key distribution system in said sending location and said second strong key distribution system in said receiving location, for exchanging strong, symmetric keys;

a first commercial data masking subsystem coupled to strong key distribution system at said sending location, which comprises:

a first weakening function means having an input coupled to said first strong key distribution system, for receiving a strong, symmetric key;

said first weakening function means transforming said strong, symmetric key into a weakened key;

an encryption function means having a key input coupled to said output of said first weakening function means and a data input coupled to a source of data to be masked;

a second commercial data masking subsystem having an input coupled to said second strong key distribution system at said receiving location, which further comprises:

a second weakening function means having an input coupled to said second strong key distribution system for receiving a strong, symmetric key;

said second weakening function means transforming said strong, symmetric key into a weakened key;

a decryption function means having a key input coupled to said output of said second weakening function means, and a data input, for receiving masked data transmitted over a weakened data privacy channel coupled to said output of said encryption function means at sending location and said input of said decryption function means at said receiving location, for decrypting said masked data using said weakened key, to recover said data in clear text form;

said weakened data privacy channel coupled to said first commercial data masking subsystem at said sending location and said second commercial data masking subsystem at said receiving location;

a first one-way function means having an input coupled between said output of said first strong key distribution system and said input of said first weakening function means in said first commercial data masking subsystem, for performing a one-way transformation of said strong, symmetric key, said transformed expression being input to said first weakening means function; and a second one-way function means connected between said output of said second strong key distribution system at said receiving location and said input of said second weakening function means in said second commercial data masking subsystem, for performing a corresponding transformation of said strong key output from said second strong, symmetric key distribution system, to apply a transformed expression to said input of said second weakening function means.

20. In a data processing network, a system for transmitting commercial masked data from a sending location to a receiving location, comprising:

a first strong key distribution system at the sending location for managing the distribution of strong, DEA, cryptographic keys;

a second strong key distribution system at the receiving location for managing the distribution of strong, DEA keys;

a strong key distribution channel coupled between said first strong key distribution system in said sending location and said second strong key distribution system in said receiving location, for exchanging strong, DEA keys;

a first commercial data masking subsystem coupled to strong key distribution system at said sending location, which comprises:

a first weakening function means having an input coupled to said first strong key distribution system, for receiving a strong, DEA key;

said first weakening function means transforming said strong, DEA key into a weakened key;

an encryption function means having a key input coupled to said output of said first weakening function means and a data input coupled to a source of data to be masked;

a second commercial data masking subsystem having an input coupled to said second strong key distribution system at said receiving location, which further comprises:

a second weakening function means having an input coupled to said second strong key distribution system for receiving a strong, DEA key;

said second weakening function means transforming said strong, DEA key into a weakened key;

a decryption function means having a key input coupled to said output of said second weakening function means, and a data input, for receiving masked data transmitted over a weakened data privacy channel coupled to said output of said encryption function means at sending location and said input of said decryption function means at said receiving location, for decrypting said masked data using said weakened key, to recover said data in clear text form;

said weakened data privacy channel coupled to said first commercial data masking subsystem at said sending location and said second commercial data masking subsystem at said receiving location;

a first one-way function means having an input coupled between said output of said first strong key distribution system and said input of said first weakening function means in said first commercial data masking subsystem, for performing a one-way transformation of said strong, DEA key, said transformed expression being input to said first weakening means function; and a second one-way function means connected between said output of said second strong key distribution system at said receiving location and said input of said second weakening function means in said second commercial data masking subsystem, for performing a corresponding transformation of said strong key output from said second strong, DEA key distribution system, to apply a transformed expression to said input of said second weakening function means.

* * * * *